United States Patent Office — 2,809,180 — Patented Oct. 8, 1957

2,809,180

CURABLE ORGANOPOLYSILOXANE COMPOSITIONS HAVING HYDROLYZED ALKYL TRIHALOGENOSILANE FILLER AND CURED PRODUCTS OF SAME

George V. Browning and Arthur M. Bueche, Schenectady, N. Y., assignors to General Electric Company, a corporation of New York No Drawing. Application November 1, 1954, Serial No. 466,224

8 Claims. (Cl. 260—42)

This invention is concerned with solid, elastic organopolysiloxanes having improved electrical properties. More particularly, the invention is concerned with the preparation of cured, solid, elastic organopolysiloxanes (silicone rubbers) having improved electrical properties especially in the presence of moisture, said organopolysiloxanes containing as a filler a finely divided alkyl polysiloxane obtained by hydrolyzing an alkyl trihalogenosilane in a water-in-oil emulsion, and thereafter separating and isolating the finely divided alkyl polysiloxane and using it as a filler for silicone gum.

Filled silicone rubber products have come to find eminent use in the fabrication of many articles because of their outstanding resistance to heat and their ability to remain flexible at low temperatures as low as −100° C. However, heretofore these filled silicone rubbers have been unsatisfactory in many applications requiring maintenance of high electrical resistance under high humidity conditions. Such defects have occurred especially when employing finely divided silicas such as fumed silicas, silica aerogel, precipitated silicas, etc., as the fillers. These finely divided silicas are desirable as fillers because of their improved reinforcing action giving products of exceptional tensile strengths and elongations. However, they are adversely affected by moisture even when employed as fillers for silicone rubber so that their use in many electrical applications has been somewhat limited and unsatisfactory.

We have now discovered a type of filler which can be employed in the manufacture of silicone rubber, which gives cured, solid, elastic products which are extremely moisture-resistant. Moreover, the electrical properties of these cured products remain at a high level despite the fact that they may come in direct contact with moisture or high humidity conditions. In order to accomplish these results, we employ as a filler for the solid, elastic organopolysiloxane a special finely divided alkyl polysiloxane obtained in a certain manner, namely, by effecting the hydrolysis of an alkyltrihalogenosilane in a water-in-oil emulsion which gives finely divided particles, and therefore isolating the latter from the oil and using it as a filler. This finely divided alkyl polysiloxane (which may comprise from 10 to 100 percent, by weight, of the alkyl polysiloxane based on the weight of the convertible organopolysiloxane) is extremely hydrophobic and enables one to obtain cured silicone rubber products having the improved electrical properties described above.

The silicone gums or silicone compositions convertible to the cured, solid, elastic state may be highly viscous masses or gummy elastic solids depending on the state of condensation, the condensing agent employed, the starting organopolysiloxane used to make the convertible organopolysiloxane, etc. These silicone gums in which the above described filler will be incorporated, will hereinafter be referred to as "convertible organopolysiloxane" or more specifically as "convertible methyl polysiloxane." Although convertible organopolysiloxanes with which the present invention is concerned are well known, for purposes of showing persons skilled in the art the various convertible organopolysiloxanes which may be employed in the practice of the present invention, attention is directed to the convertible organopolysiloxanes disclosed and claimed in Agens Patent 2,448,756, issued September 7, 1948, or Sprung et al. Patent 2,448,556, issued September 7, 1948, Sprung Patent 2,484,595, issued October 11, 1949, Krieble et al. Patent 2,457,688, issued December 28, 1948, Hyde Patent 2,490,357, issued December 6, 1949, Marsden Patent 2,521,528, issued September 5, 1950, and Warrick Patent 2,541,137, issued February 13, 1951.

It will, of course, be understood by those skilled in the art that other convertible organopolysiloxanes containing the same or different silicon-bonded organic substituents (e. g., methyl, ethyl, propyl, phenyl, tolyl, xylyl, benzyl, phenylethyl, naphthyl, chlorophenyl, both methyl and phenyl, etc. radicals) connected to silicon atoms by carbon-silicon linkages, may be employed without departing from the scope of the invention.

The particular convertible organopolysiloxane used is not critical and may be any one of those described in the foregoing patents which are generally obtained by condensation of a liquid organopolysiloxane containing an average of from about 1.95, preferably from about 1.98 to about 2.05 organic groups per silicon atom. The usual condensing agents which may be employed and which are well known in the art may include, for instance, ferric chloride hexahydrate, phenyl phosphoryl chloride, alkaline condensing agents, such as potassium hydroxide, sodium hydroxide, etc. These convertible organopolysiloxanes generally comprise polymeric diorganosiloxanes which may contain, for example, 2 mol percent copolymerized monoorganosiloxane, for example, copolymerized monomethylsiloxane. Generally, we prefer to use as the starting liquid organopolysiloxane from which the convertible, for example, heat-convertible organopolysiloxane is prepared, one which contains about 1.999 to 2.01, inclusive, organic groups, for example, methyl groups, per silicon atom and where more than about 90 percent, preferably 95 percent, of the silicon atoms in the polysiloxane contain two silicon-bonded dialkyl groups.

The starting organopolysiloxanes used to make the convertible organopolysiloxanes by condensation thereof preferably comprise organic substituents consisting essentially of monovalent organic radicals attached to silicon through carbon-silicon linkages, there being on the average between 1.95 and 2.25 organic radicals per silicon atom, and in which the siloxane units consist of units of the structural formula $R_2SiO$ where R is preferably a radical of the group consisting of methyl and phenyl radicals. At least 90 per cent of the total number of R groups are preferably methyl radicals. The polysiloxane may be one in which all of the siloxane units are $(CH_3)_2SiO$ or the siloxane may be a copolymer of dimethylsiloxane and a minor amount (e. g., from 1 to 20 mol percent) of any of the following units alone or in combination therewith:

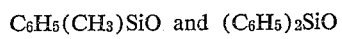
$C_6H_5(CH_3)SiO$ and $(C_6H_5)_2SiO$

A small amount of a cure accelerator, for instance, benzoyl peroxide, tertiary butyl perbenzoate, zirconyl nitrate, etc. may be incorporated into the convertible organopolysiloxane for the purpose of accelerating its cure as is more particularly described in various patents calling for the use of these materials as cure accelerators for silicone rubber. The cure accelerator functions to yield cured products having better properties, for instance, improved elasticity, tensile strength, and tear resistance than is obtained by curing similar convertible organopolysiloxane from which the cure accelerator has been omitted. The amount of cure accelerator which may be used may be varied, for example, from about 0.1 to about 8 or more percent, preferably from about 1 to 4 percent, by weight, based on the weight of the convertible organopolysiloxane. The use of high energy electrons to effect curing of the filled silicone gum is not precluded.

The preparation of the alkyl polysiloxane filler from the alkyltrihalogenosilane, for example, methyltrichlorosilane, ethyltrichlorosilane, butyltrichlorosilane, etc. is relatively simple. A water-in-oil emulsion is first prepared by mixing with water a hydrocarbon oil preferably one having viscosity range from about 25 to 3000 centipoises. The use of lower viscosity hydrocarbons will yield coarser particles. Generally, it is desirable to employ viscous hydrocarbon mineral oils such as mineral oil, paraffin oil, albolene, etc., and to add an emulsifying agent to the latter and while vigorously mixing the oil, for instance, in a Waring Blendor, to add the water until emulsification has taken place. Weight ratios of from 0.1 to 1 part water per part of the oil may be used. Thereafter, the alkyltrihalogenosilane is added preferably in the form of a solution in an inert solvent such as iso-octane, etc., and the mixture of ingredients again mixed in a rapidly stirring equipment such as the aforementioned Waring Blendor. After allowing the formed gel to settle, the supernatant liquid is carefully removed, e. g., by pouring, and the gel is then washed several times with a suitable hydrocarbon solvent such as the aforementioned iso-octane to remove traces of the oil used to make the water-in-oil emulsion. Thereafter, the gel is filtered and heated in an oven at a temperature of about 150 to 200° C. to remove any volatile material such as unreacted alkyltrihalogenosilane, water, low molecular weight products, etc., and preferably until no further change in weight occurs.

The amount of water used for hydrolysis purposes in the water-oil-emulsion should be at least equal to that required to effect hydrolysis of all the silicon-bonded chlorine in the alkyltrihalogenosilane. Thus, on a weight basis we may employ from about 0.25 to 4 parts or more of water per part of the alkyltrihalogenosilane. Various emulsifying agents may be used for making the emulsion of the water-in-oil as, for instance, ordinary hand soap, surface active agents, etc., 2-ethylhexyl esters of sodium sulfosuccinate (Aerosol OT sold by American Cyanamid Co.), morpholine salts of fatty acids such as morpholine oleate, as well as other commercially available emulsifying agents, e. g., the Aerosols, the Tritons, etc. The amount of emulsifying agent used for making the water-in-oil emulsion is very small and is generally on the order of about 0.001 to about 0.01 percent, by weight, based on the weight of the mixture of the water and the oil. The alkyltrihalogenosilane is preferably added to the water-in-oil emulsion in the form of a dilute solution in a suitable solvent such as a hydrocarbon solvent. Concentrations of about 10 to about 50 percent of the alkyltrihalogenosilane in a solvent such as iso-octane is usually satisfactory. After effecting interaction between the alkyltrihalogenosilane and the water-in-oil emulsion, the oil is uniformly distributed through the system. It is then desirable to further dilute the reaction mixture with additional solvent such as the aforesaid iso-octane in order to decrease the amount of hydrocarbon oil present in the gel structure to as low a concentration as possible. The alkyl polysiloxane gel is substantially freed of the hydrocarbon oil by filtration or decantation and is then preferably again washed several times with the solvent for the oil and then dried at elevated temperatures, preferably under vacuum, to give a fluffy, finely divided mixture of well-defined alkyl polysiloxane particles having a surface area of from 75 to 350 square meters per gram.

In order that those skilled in the art may better understand how the present invention may be practiced, the following examples are given by way of illustration and not by way of limitation.

EXAMPLE 1

A water-in-oil emulsion was prepared by mixing 300 cc. of a viscous mineral oil (Nujol of about 1000 centipoises viscosity) with 20 cc of water containing 0.1 cc. of a liquid hand soap in a Waring Blendor running at top speed of about 1500 R. P. M. After emulsification of the water in the oil had been accomplished, a solution composed of 35 cc. methyltrichlorosilane in 100 cc. iso-octane was added slowly over a period of about 2 to 3 minutes by pouring it into the vortex of the contents of the blender. The blender was kept rotating at full speed during this addition and was permitted to run an additional 10 minutes after the addition of the methyltrichlorosilane solution was completed. The contents of the blender were placed in a 1500 cc. vessel and mixed with 1,000 cc. of iso-octane. After the gel in the mixture had settled, the supernatant liquid was carefully poured from the vessel. This washing of the gel with iso-octane (petroleum ether or acetone may also be used) was repeated about five times to remove essentially all of the oil used in preparing the water-in-oil emulsion. Thereafter the gel which comprised finely divided, fluffy particles of methylpolysiloxane having a ratio of about one methyl group per silicon atom was filtered, dried under vacuum and then further dried by heating in an oven at about 170° C. until it exhibited no change in weight after about 24 hours. These particles had a surface area of 277 square meters per gram.

EXAMPLE 2

The finely divided methylpolysiloxane described in Example 1 was mixed with a methylpolysiloxane gum obtained by condensing and polymerizing octamethylcyclotetrasiloxane with a small amount of potassium hydroxide in the manner described in U. S. Patent 2,666,041—Pfeifer, issued January 12, 1954, and assigned to the same assignee as the present invention. In preparing the curable, filled methylpolysiloxane gum, 15 grams of the methylpolysiloxane gum itself were mixed with 7.1 grams of the finely divided methylpolysiloxane filler described in Example 1, and 0.29 gram benzoyl peroxide on a rubber mill, and the mixture of ingredients thereafter cured in a press for about 20 minutes at 125° C. at about 500 p. s. i. The sample was further heat-treated in an oven at 150° C. for about two hours after which it was tested and found to have a tensile strength of 432 p. s. i. and an elongation of 300 percent. A sample of this material did not crack on bending after three weeks in a 250° C. air oven. The cured, filled silicone rubber was immersed in water for seven days. At the end of this time, it was found that the power factor at 60 cycles per second was 0.0038 as compared to the power factor before immersion in the water of 0.0015.

EXAMPLE 3

Another sample of the finely divided methylpolysiloxane filler was prepared similarly as described in Example 1 but this time employing 400 cc. of the mineral oil and 80 cc. of water. The methyltrichlorosilane solution was composed of 50 cc. of methyltrichlorosilane in 100 cc. of the iso-octane. The method of effecting interaction between the oil-in-water emulsion and the methyltrichlorosilane solution, as well as isolation of the finely divided methylpolysiloxane filler, was essentially the same as that described in Example 1.

EXAMPLE 4

About 57 grams of the methylpolysiloxane powder described in Example 3 were mixed with 126 grams of the methylpolysiloxane silicone gum referred to in Example 2 and in the aforementioned Pfeifer patent, together with 2.08 grams benzoyl peroxide. The mixture of ingredients was pressed into the form of a sheet at about 125° C. for approximately 20 minutes at a pressure of about 500 p. s. i. and thereafter further cured in a 150° C. oven for about 24 hours. Samples of this cured material as well as samples prepared from the same convertible methylpolysiloxane gum with an equivalent amount of silica aerogel as a filler and benzoyl peroxide, the latter also being cured or vulcanized similarly as above, were thereafter tested for power factor and dielectric strength. The electrical tests on the samples using the methylpolysiloxane as the finely divided filler were conducted after immersion in water for eight days, while the tests on the sample composed of the silica aerogel-filled silicone rubber were conducted on samples which were immersed in water for seven days. The following Table I shows the results of these tests.

*Table I*

|  | Power Factor, 60 Cycles/Sec. | Dielectric Strength, Volts/mil |
|---|---|---|
| Methylpolysiloxane-filled: |  |  |
| Prior to immersion | 0.0007 | 442 |
| After immersion | 0.0011 | 792 |
| Silica-aerogel-filled: |  |  |
| Prior to immersion | 0.0015 | 600 |
| After immersion [1] | 2.6 |  |

[1] The immersion time was only for 60 hours.

It should be noted that contrary to using silica aerogel as a filler for silicone rubber, where the dielectric strength decreases after immersion in water, the dielectric strength of the methylpolysiloxane-filled silicone rubber increased and almost doubled in value, while the increase in power factor was extremely low as compared to the increase in power factor for the silica-aerogel-filled material.

It will, of course, be apparent to those skilled in the art that other alkylpolysiloxane fillers may be employed in place of the methylpolysiloxane filler described in the foregoing examples by using other alkyltrihalogenosilanes, for instance, ethyltrichlorosilane, propyltrichlorosilane, etc. In addition, the proportions of the alkylpolysiloxane filler employed may be varied widely depending on the application and convertible organopolysiloxane used. Thus, on a weight basis we may use from about 0.1 to 1 part or more of the alkylpolysiloxane filler per part of the convertible organopolysiloxane. The addition of small amounts of other fillers, such as titanium dioxide, lithopone, silica aerogel, iron oxide, calcium carbonate, etc. in amounts not exceeding 10 percent of the total weight of the weight of the alkylpolysiloxane filler is not precluded, and may be desirable in certain applications where the optimum electrical properties of the range recited above are not essential.

Obviously, other types of additives including different curing agents well known in the art, compression set additives such as mercury salts, and quinone type compounds (described in the above-mentioned Pfeifer patent), dyes, pigments, etc. may also be added within the scope of the invention.

Instead of using added vulcanization or cure accelerators of a chemical nature, one may also use high energy electrons to effect vulcanization of the filled convertible organopolysiloxane in the manner disclosed and claimed in Lewis and Lawton application Serial No. 291,542, filed June 3, 1952, and assigned to the same assignee as the present invention.

The products of this invention are especially useful in such applications as insulation for electrical equipment, for example, as insulation for electrical conductors (for example, those having copper or aluminum cores), as gaskets, or tubing or shock absorbers, etc. They are particularly suitable because of their high temperature resistance and electrical properties as insulating media (e. g., gaskets, etc.) in the manufacture of capacitors because of the fact that in addition to the high temperature resistance and good electrical properties, the cured, solid, elastic organopolysiloxanes obtained in accordance with the practice of the present invention are resistant to the effects of halogenated hydrocarbons used as insulating media in the manufacture of the aforesaid capacitors. The use of these finely divided alkyl polysiloxanes as fillers in organopolysiloxane resin having organic-to-silicon ratios of from 1.0 to 1.8 organic groups per silicon atom is not precluded and can give enamels or coating films of good heat resistance and good electrical properties.

What we claim as new and desire to secure by Letters Patent of the United States is:

1. A curable composition of matter comprising (1) 1.0 part by weight of an organopolysiloxane convertible to the cured, solid, elastic state, the organo groups of said organopolysiloxane being selected from the class consisting of hydrocarbon radicals and chlorophenyl radicals, and (2) from 0.1 to 1.0 part by weight of a filler for (1) comprising a solid, finely divided alkyl polysiloxane obtained by effecting hydrolysis of an alkyl trihalogenosilane in a water-in-oil emulsion in which the oil component is a hydrocarbon oil having a viscosity of from about 25 to 3000 centipoises, and thereafter isolating the formed alkyl polysiloxane finely divided filler, said filler having a surface area of from 75 to 350 square meters per gram.

2. The cured product of claim 1.

3. A curable composition of matter comprising (1) 1.0 part by weight of a methyl polysiloxane convertible to the cured, solid, elastic state and (2) from 0.1 to 1.0 part by weight of a filler for (1) comprising a solid, finely divided alkyl polysiloxane obtained by effecting hydrolysis of an alkyltrihalogenosilane in a water-in-oil emulsion in which the oil component is a hydrocarbon oil having a viscosity of from about 25 to 3000 centipoises, and thereafter isolating the formed alkyl polysiloxane finely divided filler, said filler having a surface area of from 75 to 350 square meters per gram.

4. The cured product of claim 3.

5. A curable composition of matter comprising (1) 1.0 part by weight of an organopolysiloxane convertible to the cured, solid, elastic state, the organo groups of said organopolysiloxane being selected from the class consisting of hydrocarbon radicals and chlorophenyl radicals, and (2) from 0.1 to 1.0 part by weight of a filler for (1) comprising a solid, finely divided methyl polysiloxane obtained by effecting hydrolysis of methyltrichlorosilane in a water-in-oil emulsion in which the oil component is a hydrocarbon oil having a viscosity of from about 25 to 3000 centipoises, and thereafter isolating the formed methyl polysiloxane finely divided filler, said filler having a surface area of from 75 to 350 square meters per gram.

6. The cured product of claim 5.

7. A curable composition of matter comprising (1) 1.0 part by weight of a methyl polysiloxane convertible to the cured, solid, elastic state and (2) from 0.1 to 1.0 part by weight of a filler for (1) comprising a solid, finely divided methyl polysiloxane obtained by effecting hydrolysis of methyltrichlorosilane in a water-in-oil emulsion in which the oil component is a hydrocarbon oil having a viscosity of from about 25 to 3000 centipoises, and thereafter isolating the formed methyl polysiloxane finely divided filler, said filler having a surface area of from 75 to 350 square meters per gram.

References Cited in the file of this patent

UNITED STATES PATENTS

| 2,258,218 | Rochow | Oct. 7, 1941 |
| 2,442,196 | Coggeshall | May 25, 1948 |